United States Patent [19]

Bontempelli

[11] 4,280,980

[45] Jul. 28, 1981

[54] PROCESS AND APPARATUS FOR HANDLING AND/OR STORING GALLIUM IN THE METALLIC STATE

[75] Inventor: Jean-Claude Bontempelli, Champigny sur Marne, France

[73] Assignee: Rhone-Poulenc Industries, Paris, France

[21] Appl. No.: 105,229

[22] Filed: Dec. 19, 1979

[30] Foreign Application Priority Data

Nov. 6, 1979 [FR] France ............................ 79 27284

[51] Int. Cl.³ ...................... B01J 19/00; B65D 85/84; B65D 81/38
[52] U.S. Cl. .................................. 422/40; 75/0.5 R; 206/205; 206/524.4; 206/525; 428/642; 165/104.17
[58] Field of Search .................. 422/40, 41; 75/0.5 R; 428/642; 206/205, 524.4, 525; 165/104 S

[56] References Cited

U.S. PATENT DOCUMENTS

| | | | |
|---|---|---|---|
| 1,685,666 | 9/1928 | Brophy et al. | 422/41 X |
| 2,156,357 | 5/1939 | Simpson | 206/205X |

FOREIGN PATENT DOCUMENTS

| | | | |
|---|---|---|---|
| 2026328 | 12/1971 | Fed. Rep. of Germany | 422/40 |
| 300985 | 2/1930 | United Kingdom | 422/40 |

*Primary Examiner*—Barry Richman

[57] ABSTRACT

A process and an apparatus are provided for protecting gallium in the metallic state from the heat of the outer environment during handling and/or storing thereof. In accordance with one preferred embodiment, means are provided to produce around the gallium an enclosure which is heat-insulated from the environment and manganese nitrate arranged in an air-tight envelope is placed within the said enclosure.

17 Claims, 2 Drawing Figures

PROCESS AND APPARATUS FOR HANDLING AND/OR STORING GALLIUM IN THE METALLIC STATE

BACKGROUND OF THE INVENTION

The present invention relates to a process and apparatus for protecting gallium in the solid, metallic state from the heat of the outside environment during handling and/or storage thereof.

The handling of gallium in the solid, metallic state is difficult since it melts at 29.78° C. For many uses of gallium and, in particular, of the very pure metallic gallium used in the electronic industry, it is advantageous to avoid having the gallium melt while it is handled and/or stored and, in particular, during its transportation between the place of its production and the place of its use.

Until now, the practice has been to protect metallic gallium from the heat of the external environment during handling and/or storage thereof by thermally insulating it by means of packing bodies of plastic material, in particular, expanded polystyrene, and by assuring the maintenance of a low temperature by means of dry ice. This solution is, however, unsatisfactory when the temperature of the external environment exceeds the melting point of gallium, particularly intermittently, and when the handling and storing of the gallium are effected for a period of time of more than a few days.

By the present invention there is provided a process and an apparatus which overcome the defects presented by those previously used and which make it possible, in particular, to protect the gallium from the heat of the external environment during handling and/or storage thereof and, in particular, during its transportation, even at temperatures which exceed the melting point of the gallium, particularly intermittently, and for periods of time of more than several days.

The foregoing, therefore, describes several, among the important objects of the invention.

Other objects will be apparent to those skilled in the art from the present description, taken in conjunction with the appended drawings, in which.

GENERAL DESCRIPTION OF THE INVENTION

Figure 1:
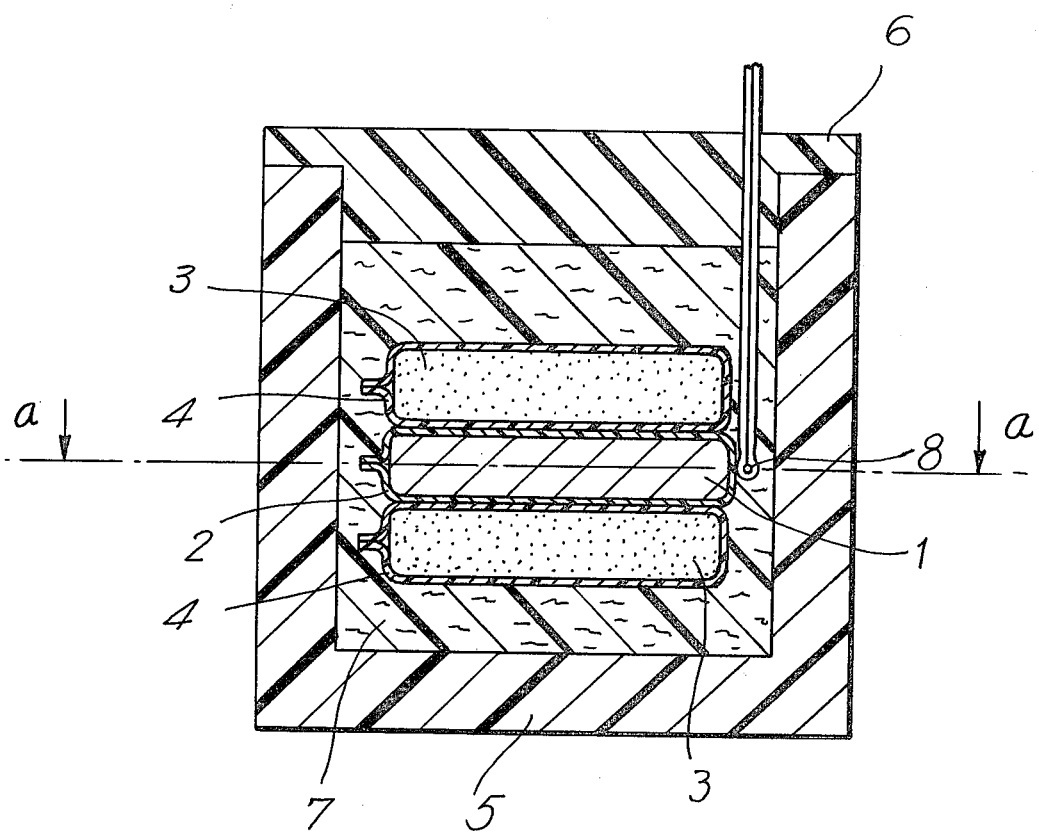
FIG. 1 is a cross-section of the apparatus or storage device of the present invention taken in a horizontal section.

The present invention comprises, in part, a process for protecting gallium in the solid, metallic state from melting during handling and/or storage, the process comprising use of a means for producing around the gallium an enclosure which is heat-insulated from the environment and employing, within the said enclosure, a protective compound having an initial melting temperature of between about 20° C. and 29.70° C., hereinafter being referred to as "the compound."

The present invention also comprises an apparatus or device for employment in the process of the invention, described above. This apparatus or device comprises an air-tight envelope containing a protective compound ("the compound") which has a melting point of between about 20° C. and 29.70° C., and a closed enclosure which thermally protects the resulting assembly from the outside environment.

The metallic gallium used may be in any form whatsoever and, in particular, in the form of balls or ingots or contained in bottles.

"The compound," which has an initial melting temperature of between about 20° C. and 29.70° C., is a solid or crystalline body. It must, of course, be non-toxic, non-corrosive and non-explosive. Upon melting, the said compound absorbs heat and keeps the ambient environment containing the metallic gallium at a temperature very close to that of its melting point. "The compound" of the process of the invention, therefore, constitutes a heat regulator whose function takes effect only if the temperature of the surrounding environment tends to rise above the temperature of the melting point of gallium. Thus, if the temperature of the surrounding environment remains less than its melting point, the role of the heat regulator ("the compound") remains in reserve, contrary to the prior conventional practice in accordance with which one employs as heat regulator, dry ice, whose temperature of change of state is very low and which sublimates, whatever the customary outside temperature. This feature constitutes an additional advantage of the process of the present invention over the prior art.

"The compound" which can be used in the process of the invention may be any of the following, which are given as examples only:

2-ethoxy-benzoic acid, 1,4-diaminobutane, 1,4-butanediol, cyclohexanol, 1-methyl-cyclohexanol, 2,3,3-trimethylcyclohexanol, 1-dodecanol, 2-dodecanone, ferric bromide hexahydrate, glycerine, 6-hundecanol, heptadecane, 1,7-heptanediol, isoquinoline, manganese nitrate, butyl octadecanoate, isobutyl octadecanoate, isopropyl octadecanoate, 3-methyl butyl octadecanoate, propyl octadecanoate, the potassium ferric sulfate dihydrate.

In accordance with one preferred embodiment of the process of the invention, manganese nitrate is employed as "the compound." The manganese nitrate used is in crystalline form. Hexahydrated manganese nitrate is desirable, corresponding to a water content of 37.64 percent, or else compositions of manganese nitrate and water containing either between about 34 and 42 percent by weight of water or between about 22 and 24 percent by weight of water. Manganese nitrate hexahydrate or compositions of manganese nitrates and water containing 23 percent and 36 percent, respectively, by weight of water, which correspond to two eutectic compositions of manganese nitrate, are preferably employed.

In accordance with one variant or embodiment of the present invention, means are employed to protect the gallium in the metallic state against contamination. These means constitute a contact packing of the gallium. In the preferred embodiments of the process of the invention, these means consist, in particular, of envelopes or bags of composite materials, such as, for example, of aluminum, polyethylene, or tubes, ampules, bags or envelopes of plastic material, such as, for example, polyethylene, polypropylene, etc.

In accordance with another variant or embodiment of the process of the invention, gallium in the metallic state, possibly within its contact packing, can be surrounded by pieces of plastic, particularly pieces of expanded polystyrene, in order to reinforce the thermal insulation and produce a wedging of the gallium in the entire container device.

"The compound" used is placed in an envelope contained within the closed enclosure which thermally protects the assembly from the outside environment. The envelope used must be air-tight in order to prevent contamination of the enclosure of the gallium by the said "the compound" and it should preferably have an overall heat exchange co-efficient greater than that of the contact packing of the gallium, when used. In accordance with a preferred embodiment, this envelope is formed of metallic materials or plastic, and preferably, polyethylene.

The amount of "the compound" used may vary within side limits and is, in particular, a function of the time of handling and/or storage, the temperature conditions of the outside environment, and the characteristics of the enclosure.

The gallium and the air-tight envelope containing "the compound" are arranged within a closed outer enclosure which thermally protects the assembly from the outer environment. In one preferred embodiment of the invention, the enclosure is formed of plastic material and, in particular, of expanded polystyrene.

The thickness of the walls of the outer enclosure which thermally protects the assembly from the outside environment may vary within wide limits and is, in particular, a function of the duration of the handling and/or storage, and of the temperature conditions of the outside environment.

Figure 2:
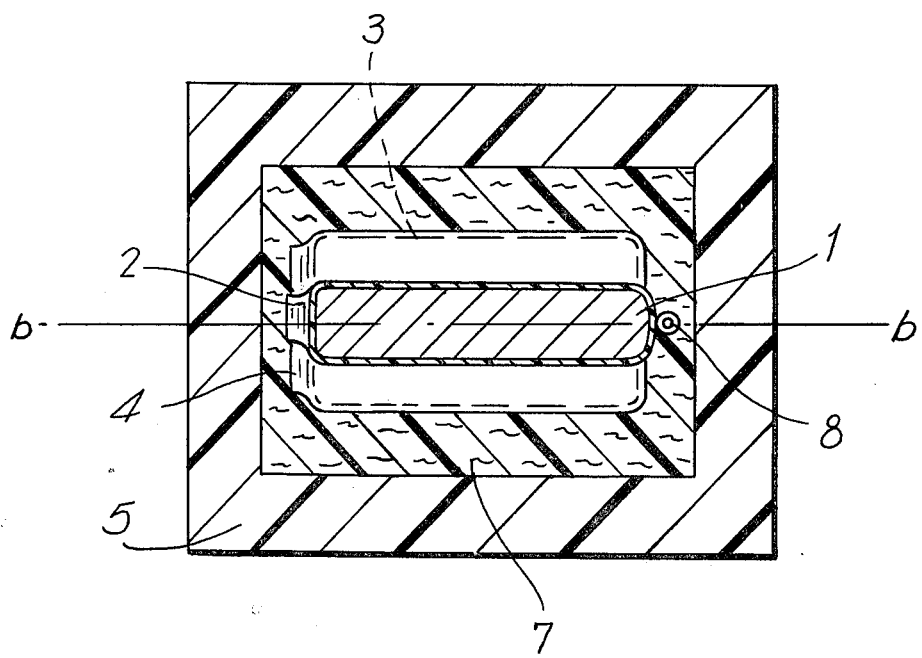
FIG. 2 is a cross-section of the apparatus or storage device of the present invention, taken along the line a—a of FIG. 1, and shown in the vertical section (with the central axis represented by the line b—b).

The apparatus or device in accordance with the present invention for handling and/or storage of the metallic gallium will now be described in a preferred embodiment with reference to FIGS. 1 and 2 of the appended drawings which show the device in a horizontal section and a vertical section, respectively.

The gallium (1), wrapped in its polyethylene envelope (2) of a thickness of about 10/100 millimeter, is placed between two quantities of "the compound" (3), which are contained within a heat-sealed polyethylene envelope (4) of about 5/100 millimeter thickness. The assembly is introduced into a box of expanded polystyrene (5) of a thickness of about 35 millimeters and covered by a fitted cover (6) of a thickness of about 54 millimeters made of the same material. As shown in the figures, this assembly is wedged and rendered immobile by a packing consisting of pieces of expanded polystyrene (7), characterized by a weight of about 5 grams, corresponding to an apparent volume of 1 liter.

In the examples which follow, which illustrate the invention without limiting the scope thereof in the apparatus or device of the invention, the temperatures indicated were determined by a thermometric probe (8) which was introduced in contact with envelope (2) through a hole provided in a fitted cover (6), as indicated in the figures. As this probe is connected to a temperature recorder, not shown in the drawings, it is obvious that this probe is not present in the devices of the invention as actually and customarily used.

SPECIFIC DESCRIPTION OF THE INVENTION

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified. The following examples refer to the accompanying drawings.

EXAMPLE 1: Comparative Example

A 1 kilogram ingot of gallium (1), housed in its polyethylene envelope (2), was introduced into the box (5) at a temperature of 10° C. and wedged by the pieces of expanded polystyrene (7) without placing a protective compound in contact with it. After the closing of the box (5) by the cover (6) and the introduction of the assembly into an aerated oven maintained at a temperature of 35° C., the temperature prevailing at the contact with envelope (2), as indicated by the probe (8), was recorded. When this temperature reached 29.5° C. to 30° C., the physical state of the gallium was checked every hour in order to be able to determine with sufficient precision the time when the melting of the gallium commenced. It is found that this incipient melting occurred 5 hours after introduction of the device into the oven.

EXAMPLE 2: Example in Accordance with the Invention

An ingot of gallium (1) of 1 kilogram, housed in its envelope (2), was introduced into the box (5) at a temperature of 10° C. and placed into contact with 2 bags (3) each containing 1 kilogram of a composition of manganese nitrate and water of 58 percent by weight crystalline $Mn(NO_3)_2$ taken from an enclosure in which they had been kept for 24 hours at a temperature of 10° C. After closing the box (5) by means of the cover (6) and introducing the assembly as in Example 1, into an aerated oven maintained at a temperature of 35° C. (as in Example 1), the temperature prevailing at the contact with envelope (2), indicated by the probe (8) was recorded. When this temperature reached 29.5° C. to 30° C., the physical state of the gallium was checked every hour. As in Example 1, the moment was ascertained when the gallium started to melt. It was found that this incipient melting did not take place until 41 hours after introduction of the device into the oven.

EXAMPLE 3: Example in Accordance with the Invention

Example 2 was repeated, differing only in that the composition of manganese nitrate and water was replaced by hexahydrated manganese nitrate, $Mn(NO_3)_2.6H_2O$, in the crystalline state, taken from an enclosure in which it had been kept at 10° C. for 24 hours. The device was placed in the oven at 35° C. and the experiment was continued in the manner described in Example 2. It was found that the incipient fusion of the gallium did not take place until 63 hours after the introduction of the device into the oven.

EXAMPLE 4: Example in Accordance with the Invention

Example 2 was repeated, except that the composition of manganese nitrate and water was replaced by the eutectic of $Mn(NO_3)_2.4H_2O$ and $Mn(NO_3)_2.2H_2O$, whose composition corresponds to a content of anhydrous manganese nitrate of 77 percent by weight. This eutectic was introduced in crystalline form, as in Examples 2 and 3, in envelopes (3), at a temperature of 10° C., and the device was then placed in the oven at 35° C. At the end of the experiment, it was found that the incipient fusion of the gallium did not take place until 84 hours after introduction of the device into the oven.

EXAMPLE 5: Comparative Example with Dry Ice as Protective Material

Example 2 was repeated, employing the same conditions as set forth in Example 2, except that the manganese nitrate was replaced by a heat regulator formed of blocks of dry ice having the shape of two rectanguler parallelepipeds of 1 kilogram each. The heat exchange surface of these blocks with the ambient environment permitted the sublimation of the dry ice in a manner comparable to that which permitted the fusion of the manganese nirate used in Example 2. The blocks of dry ice were arranged like the manganese nitrate bags (3) of Example 2 on both sides of the 1 kilogram ingot of gallium. The device was introduced into the oven at 35° C. and incipient fusion of the gallium was noted after a stay of 40 hours.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

What is claimed is:

1. A process for protecting gallium in the solid metallic state from melting upon its handling and/or storage, comprising enclosing the gallium in an enclosure which is heat-insulated from the environment and placing with said gallium within the said enclosure a protective compound having an incipient melting temperature of between about 20° C. and 29.70° C.

2. A process according to claim 1, wherein the said protective compound is selected form the group consisting essentially of:
2-ethoxy-benzoic acid, 1,4-diaminobutane, 1,4-butanediol, cyclohexanol, 1-methyl-cyclohexanol, 2,3,3-trimethylcyclohexanol, 1-dodecanol, 2-dodecanone, ferric bromide hexahydrate, glycerol, 6-hundecanol, heptadecane, 1,7-heptanediol, isoquinoline, manganese nitrate, butyl octadecanoate, isobutyl octadecanoate, isopropyl octadecanoate, 3-methyl butyl octadecanoate, propyl octadecanoate and potassium ferric sulfate dihydrate.

3. A process according to claim 1, wherein the gallium in the metallic state is surrounded by particles of plastic material.

4. A process according to claim 3, wherein the particles of plastic material comprise polystyrene balls.

5. A process according to claim 1, wherein the said protective compound is crystalline manganese nitrate or compositions of manganese nitrate and water containing either between about 34 and 42 percent by weight of water or between about 22 and 24 percent by weight of water.

6. A process according to claim 5, wherein said protective compound is hexahydrated manganese nitrate.

7. A process according to claim 5, wherein the manganese nitrate is hydrated and forms a composition of manganese nirate and water, with the amount of water being between about 34 and 42 percent, or between about 22 and 24 percent, by weight.

8. A process according to claim 5, wherein the manganese nitrate employed is in the form of a composition of manganese nitrate and water, containing about 23 or 36 percent by weight of water.

9. A process according to claim 1, wherein the gallium in metallic state is protected against contamination.

10. A process according to claim 9, wherein the gallium is protected against contamination by an envelope or bag of composite materials.

11. A process according to claim 10, wherein the composite materials are of aluminum and polyethylene.

12. A process according to claim 10, wherein the gallium is protected from contamination by enclosure in a plastic material.

13. A process according to claim 12, wherein the plastic material comprises polyethylene or polypropylene.

14. A device or apparatus for protecting gallium in the solid metal state from melting upon its handling and/or storage, comprising the said gallium metal, an air-tight envelope containing a protective compound having an incipient melting temperature of between about 20° C. and 29.70° C., and a closed enclosure containing said gallium and said air-tight envelope and thermally protecting the resulting assembly from the outside environment.

15. A device or apparatus according to claim 14, wherein the air-tight envelope is formed of metallic or plastic material.

16. A device or apparatus according to claim 15, wherein the enclosure is formed of plastic material.

17. A device or apparatus according to claim 16, wherein the enclosure is formed of expanded polystyrene.

* * * * *